April 8, 1941.  W. L. HANSEN ET AL  2,237,960

SLOW SPEED MOTOR

Filed Feb. 24, 1939  3 Sheets-Sheet 1

INVENTORS
WILLIAM L. HANSEN
IRA N. HURST
BY Toulmin & Toulmin
ATTORNEYS.

April 8, 1941.     W. L. HANSEN ET AL     2,237,960
SLOW SPEED MOTOR
Filed Feb. 24, 1939     3 Sheets-Sheet 2

INVENTORS,
WILLIAM L. HANSEN
IRA N. HURST
BY
Toulmin & Toulmin
ATTORNEYS.

April 8, 1941. W. L. HANSEN ET AL 2,237,960
SLOW SPEED MOTOR
Filed Feb. 24, 1939  3 Sheets-Sheet 3

INVENTORS
WILLIAM L. HANSEN
IRA N. HURST
BY
Toulmin & Toulmin
ATTORNEYS

Patented Apr. 8, 1941

2,237,960

UNITED STATES PATENT OFFICE 2,237,960

SLOW SPEED MOTOR

William L. Hansen and Ira N. Hurst, Princeton, Ind., assignors to Hansen Manufacturing Company, Inc., Princeton, Ind., a corporation of Indiana Application February 24, 1939, Serial No. 258,125

4 Claims. (Cl. 172—278)

This invention relates to electric motors and in particular to synchronous alternating current motors.

One object of this invention is to provide a synchronous motor having an annular field structure with poles projecting therefrom and having their tips arranged in a circular formation around the rotor, the poles being bifurcated and certain of the poles coming from the inside of the field structure and others coming from the outside thereof.

Another object is to provide a synchronous motor having a field coil with outer and inner annular magnetic members adjacent thereto and having pole pieces projecting into a circular formation, the pole pieces coming from the inner magnetic member being alternated with those coming from the outer magnetic member, the poles from the outer member being bent so that their tips are circumferentially aligned with the tips of the inner poles.

Another object is to provide a synchronous motor having an annular field coil with outer and inner cylindrical magnetic members having laterally projecting pole portions, these pole portions being bifurcated, the pole portions coming from the inner magnetic member being alternated with those coming from the outer magnetic member, one of the poles of each bifurcated pole portion being shaded as by a copper shading ring so as to provide a lag in the magnetic flux for facilitating starting of the motor.

Another object is to provide a synchronous motor as set forth in the preceding object wherein the tips of the poles coming from the pole portions of one of the magnetic members are bent into circular alignment with the tips of the poles coming from the other magnetic member.

Another object is to provide a synchronous motor as set forth in the foregoing objects wherein one each of the bifurcated pole portions of the outer and inner magnetic members are shaded by copper or other suitable shading rings, these shading rings being preferably split to interrupt their continuity.

Another object is to provide a synchronous motor having a field coil with outer and inner magnetic poles bent into a circular formation adjacent the rim of a rotor, the rotor consisting of an annular steel rim supported by spokes upon a rotatable shaft.

Another object is to provide a motor of the type set forth in the preceding object wherein the spokes of the rotor are bifurcated with the two arms placed adjacent the magnetic rim of the rotor, these bifurcated spokes being made of permanently magnetic material so as to provide U-shaped magnets adjacent the periphery of the rotor.

Another object is to provide a synchronous motor having a field coil with outer and inner magnetic field members associated therewith and having outer and inner poles projecting therefrom and bent so that their tips occupy a substantially circular formation adjacent the annular rim of the rotor, this annular rim having arcuate slots therein.

Another object is to provide a synchronous motor having an annular field coil surrounded by a magnetic field structure having poles projecting laterally from the outside and inside of the coil, the outer field poles being bent into a circular alignment with the tips of the inner field poles, the bending of the field poles likewise serving to secure thereto a shading member such as a copper ring for creating magnetic flux lag in certain of the poles.

General construction

In general the synchronous motor of this invention consists of an annular field coil placed between outer and inner annular magnetic members such as cylindrical steel formings. These annular magnetic members are magnetically interconnected by a steel disc and have pole portions projecting laterally therefrom. These pole portions are bifurcated, the tips of the poles coming from the outer magnetic member being bent inwardly so as to be in line with the tips of the poles coming from the inner magnetic member, the pole tips thereby arranged in a circular formation around the rim of the rotor.

Shading rings of a non-magnetic conducting material such as copper are mounted upon the poles so as to surround one only of the two poles constituting each bifurcated pole portion but prevented from entirely surrounding the other pole thereof by having the ring cut away so as to provide a detour. Each shading ring is slotted radially at one point in its periphery so as to interrupt the continuity thereof. The shading ring or rings, as the case may be, are held in position upon their respective poles by the bent condition of the outer poles, the shading rings being mounted thereon before these poles are bent.

The inward projection of the outer pole tips provides a construction which matches the opposing surface of the rotor rim and causes the rotor to "float" during its rotation when the field coil is energized. This reduces the possibility of end thrust and eliminates the necessity for providing thrust bearing or other means for preventing chattering by reason of such end thrust.

The rotor is ring shaped of hardened carbon steel and has an annular flange projecting inwardly toward the axis of rotation. This annular flange is provided with arcuate slots substantially concentric with the axis of rotation of the rotor rim thereby providing a means for quickly synchronizing the rotor and locking it in synchronization at the desired synchronous speed. The rotor is preferably mounted upon a non-magnetic spider or spokes terminating in a hub and shaft.

Figure 7:
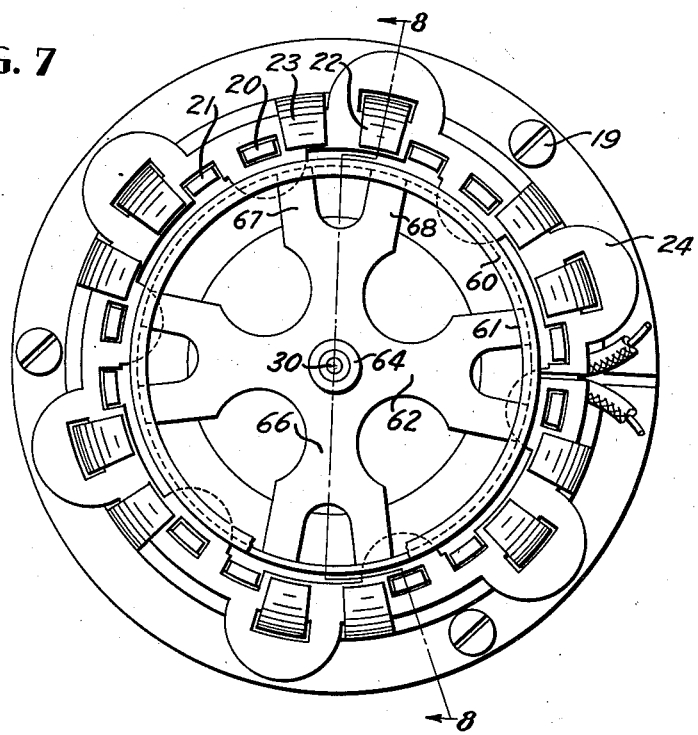
Figure 7 is a front elevation of a modified form of motor employing a rotor having Y-shaped magnetic spokes.
Figure 8:
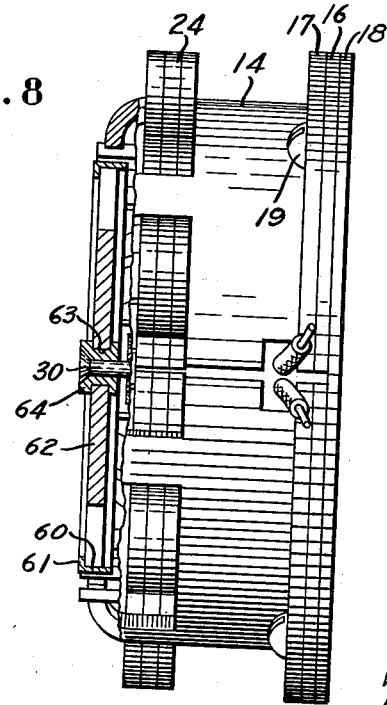
Figure 8 is a vertical section, partly in side elevation through the motor of Figure 7 taken along the line 8—8 in Figure 7.

The motor with the modified rotor shown in Figures 7 and 8 employs a magnetic rim of permanent magnetic material such as hardened carbon steel together with a magnetic spider of permanently magnetic material including bifurcated or Y-shaped magnetic spokes. By this construction each of these Y-shaped magnetic spokes has twin poles located adjacent the rotor rim. The magnetic spider of this form of rotor is secured to the rotor rim in any suitable manner, as by a sliding fit.

The annular form of the field structure provides a cylindrical chamber therein which serves for accommodating the reduction gearing ordinarily required when such a motor is used for operating a clock. In the present motor this reduction gearing is of a planetary type whereby the gearing is accommodated within a very small space and is protected by the annular field structure from damage or from unauthorized tampering.

Field structure

Figure 3:
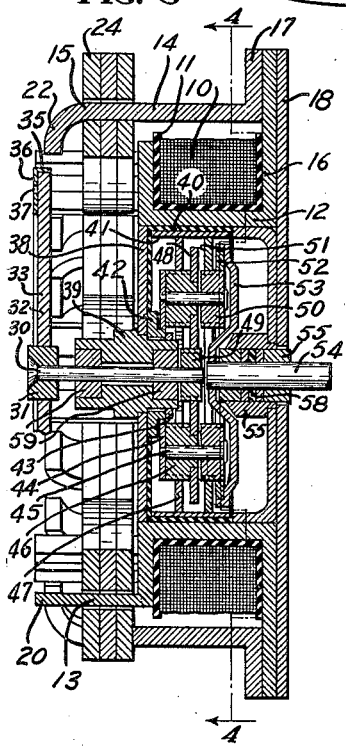
Figure 3 is a vertical longitudinal section through the motor taken along the broken line 3—3 therein.
Figure 4:
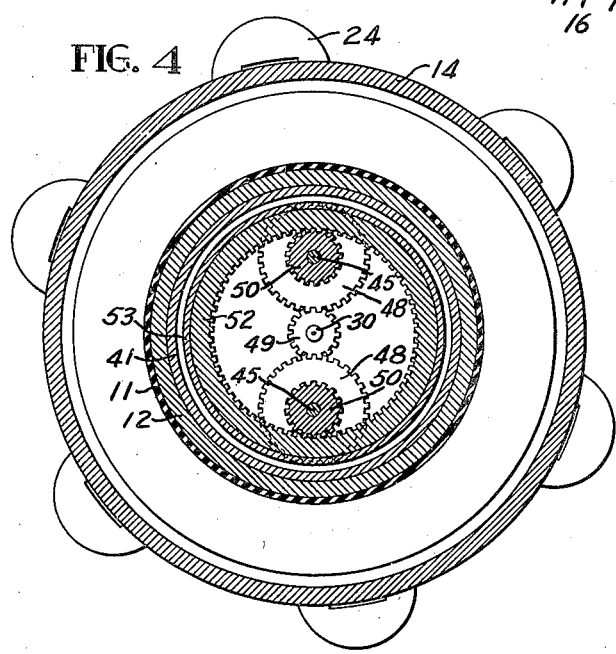
Figure 4 is a vertical cross section taken along the irregular line 4—4 in Figure 3.

Referring to the drawings in detail, Figure 3 shows a preferred embodiment of the synchronous motor of this invention as consisting of a field coil or winding 10, enclosed in an annular insulating casing 11, of fiber or other suitable material. Inside the field coil 10 is mounted a cylindrical magnetic member 12, having L-shaped pole projections 13 extending therefrom. Similarly, outside the field coil 10 is mounted a cylindrical magnetic member 14 having bent pole projections 15 alternating with the pole projections 13, to constitute a cylindrical formation. The cylindrical magnetic member 12 is provided at its rear edge with a flange 16 engaging a similarly flanged portion 17 upon the outer magnetic member 14. A non-magnetic plate 18 serves as a closure for the back of the motor. The back plate 18 and flanges 16 and 17 are held together by the screws 19.

Figure 1:
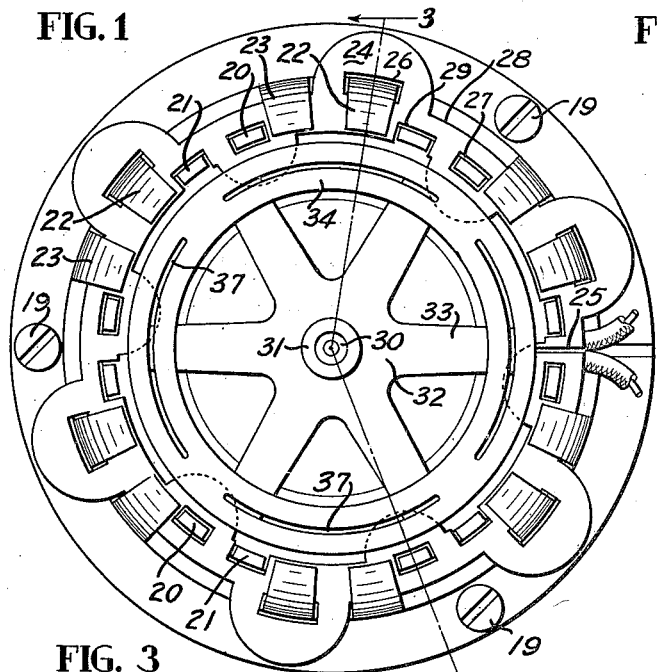
Figure 1 is a front elevation of the synchronous motor of this invention.
Figure 2:
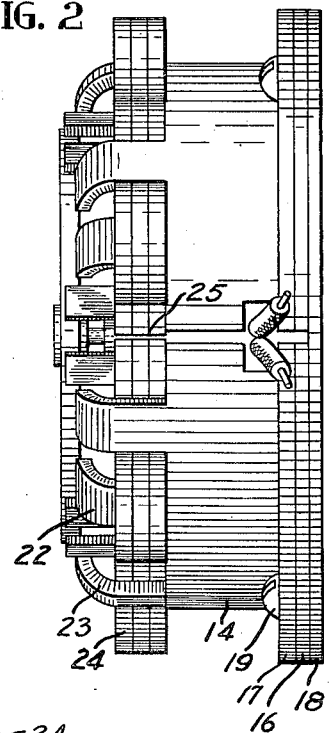
Figure 2 is a right hand side elevation of the motor shown in Figure 1.
Figure 5:
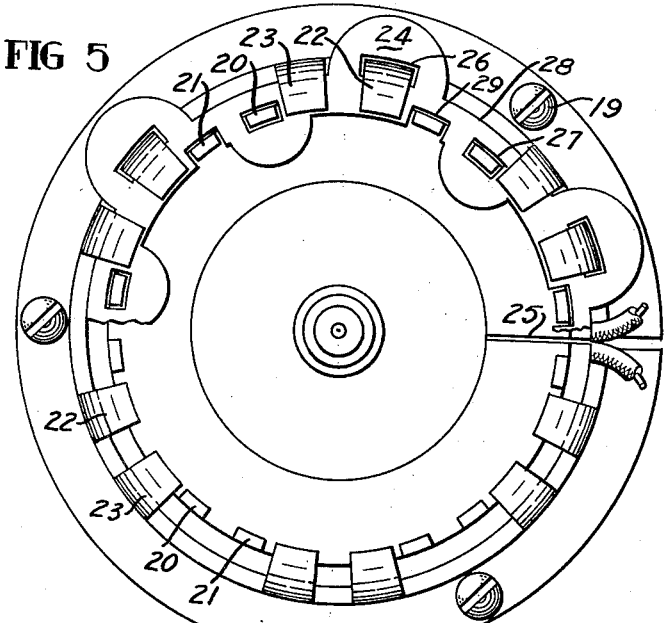
Figure 5 is a front elevation of the motor similar to Figure 1 but with the rotor removed and with approximately half of the shading rings removed.
Figure 6:
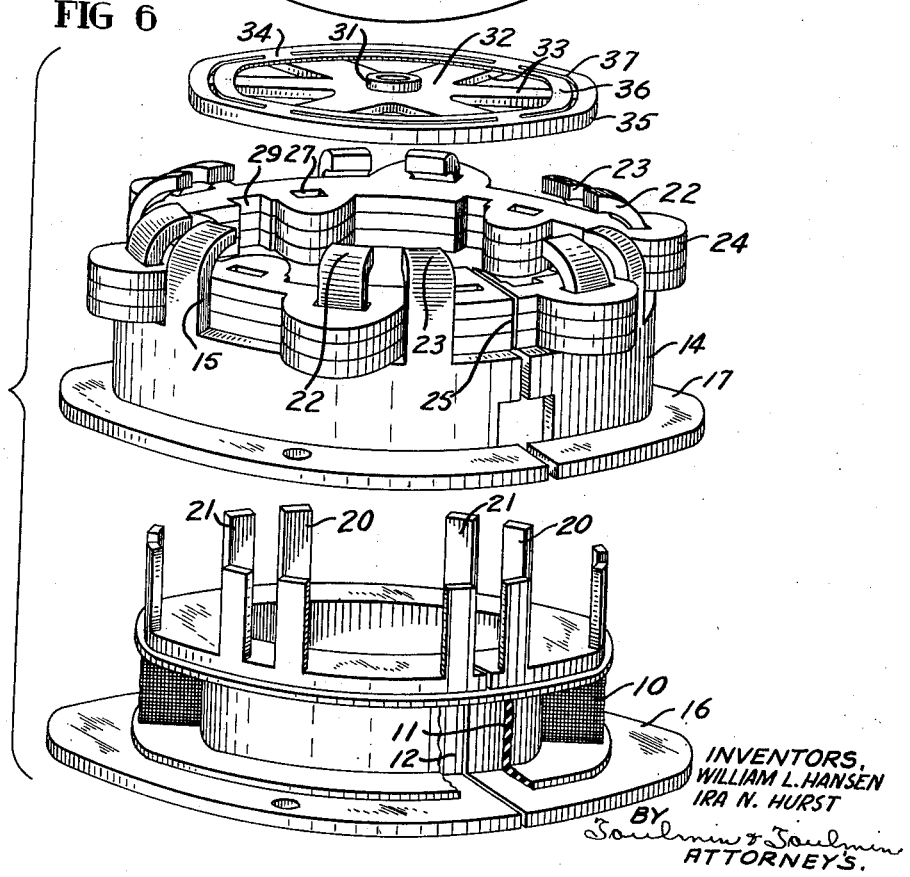
Figure 6 is an exploded perspective view of the principal parts of the motor.

The inner pole projections 13 are bifurcated so as to be divided into inner shaded poles 20 and unshaded poles 21. Similarly the outer pole projections 15 are bifurcated and thereby divided into shaded poles 22 and unshaded poles 23 (Figures 1 and 5). Mounted on the poles 20 to 23 inclusive are shading rings 24 of non-magnetic conducting material such as copper, these shading rings being slotted radially as at 25 (Figure 1) so as to interrupt the continuity of each ring.

The shading rings 24 are provided with outer and inner apertures 26 and 27 completely encircling the outer and inner shaded poles 22 and 20. Elsewhere the shading rings 24 are provided with outer and inner notches 28 and 29 for preventing the encirclement of the outer and inner unshaded poles 23 and 21 respectively.

Rotatably mounted within the field structure is a rotor shaft 30 having rotor hub 31 thereon which supports the non-magnetic spider 32, having spokes 33, the outer ends of which engage the annular rotor 34. The non-magnetic spider 32 may be made of fiber or other suitable material, whereas the magnetic rotor 34 may be made of hardened carbon steel. The rotor 34 is provided with a substantially cylindrical rim 35 and an inwardly extending flange 36, having arcuate slots 37 therein.

The cylindrical rim portion 35 of the rotor 34 and the inwardly bent poles 22 and 23 together with the poles 20 and 21 provide opposed matching surfaces which cause the rotor to "float" during its rotation when the field coil 10 is energized. Any tendency for the rotor to move inward or outward in the direction of its axis of rotation is immediately counteracted by the magnetic forces set up at the pole portion tips so that any effect of end thrust and chattering is effectively eliminated. By this construction it is unnecessary to provide special bearings for eliminating end thrusts.

Reduction gearing

The space within the inner cylindrical magnetic member 12 serves to accommodate the reduction gearing for reducing the speed of the rotor shaft 30 to the speed of one revolution per minute necessary for driving clocks. For this purpose the cylindrical magnetic member 12 receives a disc 38 which contains a hub 39 for rotatably supporting the rotor shaft 30. The cylindrical magnetic member 12 also slidably receives a cylindrical member 40 which abuts the disc 38 and further contains a cylindrical member 41 (Figure 3).

Surrounding the inner end of the hub 39 is an annular member 42 held in place by a retaining ring 43. Rotatably mounted thereon is a ring 44 serving as a support for supporting the planet gear shafts 45. Rotatably mounted upon the planet shafts 45 are planet pinions 46 meshing with the internal ring gear 47 fixedly mounted upon the annular member 41. Rigidly mounted upon the hubs of the planet pinions 46 are gears 48, which in turn mesh with the sun gear 49, which is drivingly mounted upon the inner end of the rotor shaft 30. Also rotatably mounted upon the planet shafts 45 are planet pinions 50 meshing with the internal ring gear 51, which is fixedly mounted upon the cylindrical member 41, in a manner similar to that of the ring gear 47. Likewise, meshing with the planet pinions 50 is an internal ring gear 52 fixedly secured to the yoke member 53. The latter is mounted upon the inner end of the output shaft 54 which operates the clock. The output shaft 54 is rotatably supported in the bearing members 55, within the hub 56, which is in turn supported by a flanged disc 57 slidably inserted within the cylindrical member 12. The space between the two bearing members 55 is occupied by a packing element 58 for preventing the leakage of oil along the output shaft 54. Similarly the rotor shaft 30 is supported by bearing members 59.

Modified rotor construction

The modified rotor shown in Figures 7 and 8 consists of a magnetic rim 60, having an inwardly directed flange 61. The rim 60 is made of hardened carbon steel so as to be permanently magnetized. Mounted within the rim 60 and engaging the flange 61 is a magnetic spider, generally designated 62, and having a central aperture 63 for receiving a non-magnetic hub 64. The latter is provided with a bore 65 which in turn receives the rotor shaft 30. The magnetic spider 62 is likewise constructed of permanently magnetic material and is provided with Y-shaped magnetic spokes 66, having bifurcated portions 67 and 68 forming separate poles. Thus the permanently magnetized poles 67 and 68 have their ends directly adjacent the magnetic rim 60 of the rotor. The magnetic spider 66 may be slidably inserted in the space within the magnetic rim 60 and held in position by the resilience of the material.

Operation

In the operation of the synchronous motor of this invention the field coil 10 is energized from a suitable source of alternating current, such as the ordinary commercial house lighting current. When so energized the field coil causes the magnetic projections 13 and 15 to become magnetized with opposite polarities in alternating arrangement around the motor. The pole projections 13 coming from the inside of the field coil 10 are of opposite polarity from the pole projections 15 coming from the outside thereof. The bifurcated inner poles 20 and 21 thus also become of opposite polarity from the bifurcated outer poles 22 and 23. The presence of the shading rings 24 upon the shaded poles 20 and 22 sets up a phase lag between the unshaded poles 21 and 23 and the shaded poles 20 and 22, thereby creating a rotating magnetic field. This rotating magnetic field applies a starting torque to the rotor 34 or 60 and causes the latter to commence its rotation.

When the rotor 34 or 60 reaches its predetermined synchronous speed for which it was designed, it "locks in" at this speed and continues to rotate at the desired synchronous speed. The rotor is prevented from moving forward or backward in an axial direction by the magnetic forces exerted at the pole tips and thus the rotor is caused to "float" as it rotates.

The rotation thus imparted to the rotor shaft 30 rotates the sun gear 49, which in turn rotates the planet gears 48 and planet pinions 47, around the planet shafts 45. The planet pinions 46 when thus rotated roll around in an orbital path by reason of their engagement with the internal ring gear 47, thereby imparting a rotation to the yoke 44, and moving the planet shafts 45 in an orbital path. This causes the pinions 50 likewise to move in an orbital path so as to roll around the interior of the ring gears 51 and 52. As the ring gears 51 and 52 preferably differ by but a single tooth, a very slow rotation is imparted to the output shaft 54. If the gearing is properly designed as to its number of teeth and dimensions, the output shaft 54 will rotate at the speed of one revolution per minute. This speed is suitable for driving the mechanisms of clocks.

The synchronous motor of this invention, however, is not confined merely to clock uses, but may be also used for other purposes requiring a small synchronous motor. Such uses, for example, occur in rotating radio dials, operating phonograph turntables, time switches, et cetera. In such installations the output shaft 54 may rotate at a different speed from one revolution per minute, depending upon the requirements of the particular mechanism. Under such circumstances the planetary reduction gearing may be omitted entirely where a greater speed reduction is not required.

Having thus fully described our invention, what we claim as new and desire to secure by Letters Patent is:

1. In a motor with an annular field winding, a magnetic field structure therefor comprising a magnetic cylinder which fits the interior of said winding and is provided with a radial flange extending outwardly as far as the outer periphery of the coil, inner pole pieces extending axially outward from the peripheral boundary of said flange and forming an annular outline, a magnetic cylinder surrounding the exterior of said winding, and outer pole pieces extending axially outward from the last mentioned cylinder to form an annular outline which is external to the inner pole piece outline, and a shading ring having apertures which fit over only each alternate inner pole piece and each alternate outer pole piece, said outer pole pieces being bent into circular alignment with the inner pole pieces after the shading ring had been placed into position whereby the bent pole pieces serve to maintain the shading ring in its proper vertical position.

2. In a motor with an annular field winding, a magnetic field structure therefor comprising a magnetic cylinder which fits the interior of said winding and is provided with a radial flange extending outwardly as far as the outer periphery of the coil, inner pole pieces extending axially outward from the peripheral boundary of said flange and forming an annular outline, a magnetic cylinder surrounding the exterior of said winding, and outer pole pieces extending axially outward from the last mentioned cylinder to form an annular outline which is external to the inner pole piece outline, and a shading ring having apertures which fit over only each alternate inner pole piece and each alternate outer pole piece, said outer pole pieces being bent into circular alignment with the inner pole pieces after the shading ring had been placed into position whereby the bent pole pieces serve to maintain the shading ring in its proper vertical position, said shading ring having a radial slot in order to interrupt its electrical continuity through the circular path of the ring.

3. In a motor with an annular field winding, a magnetic field structure therefor comprising a magnetic cylinder which fits the interior of said winding and is provided with a radial flange extending outwardly as far as the outer periphery of the coil, inner pole pieces extending axially outward from the peripheral boundary of said flange forming an annular outline, a magnetic cylinder surrounding the exterior of said winding, and outer pole pieces extending axially outward from the last mentioned cylinder into an annular outline which is external to the inner pole piece outline, and a shading ring for said pole pieces in order to induce a magnetic lag therein, said shading ring comprising a cylindrical member with spaced semi-circular portions projecting inwardly and outwardly respectively from the inner and outer peripheries of the ring, said portions having apertures which fit over each alternate inner pole piece and each alternate outer pole piece, respectively, in order to surround said pole pieces, said outer pole pieces being bent into circular alignment with the inner pole pieces after the shading ring has been placed in position whereby the bent pole pieces serve to maintain the shading ring in its vertical position.

4. In a motor, an annular field winding, a magnetic field structure therefor comprising a magnetic cylinder which fits the interior of said winding and is provided with a radial flange extending outwardly as far as the outer periphery of the coil, inner pole pieces extending axially outward from the peripheral boundary of said flange forming an annular outline, a magnetic cylinder surrounding the exterior of said winding, and outer pole pieces extending axially outward from the last mentioned cylinder into an annular outline which is external to the inner pole piece outline, and a shading ring for said pole pieces in order to induce a magnetic lag therein, said shading ring comprising a cylindrical member with spaced semi-circular portions projecting inwardly and outwardly respectively from the inner and outer peripheries of the ring, said portions having apertures which fit over each alternate inner pole piece and each alternate pole piece respectively, in order to surround said pole pieces, said outer pole pieces being bent into circular alignment with the inner pole pieces after the shading ring has been placed in position whereby the bent pole pieces serve to maintain the shading ring in its vertical position, said shading ring being also provided with open slots intermediate said semi-circular portions, the pole pieces other than said alternate pole pieces being contained within said slots.

WILLIAM L. HANSEN.
IRA N. HURST.